Oct. 14, 1958     D. G. MAGILL     2,855,884

METHOD OF MAKING SCORED CONTAINER BODIES

Filed June 27, 1955

INVENTOR.
DONALD G. MAGILL
BY Charles H. Erne
Leland R. McCann
George W. Reiber
ATTORNEYS United States Patent Office 2,855,884
Patented Oct. 14, 1958

2,855,884

METHOD OF MAKING SCORED CONTAINER BODIES

Donald G. Magill, Great Neck, N. Y., assignor to American Can Company, New York, N. Y., a corporation of New Jersey Application June 27, 1955, Serial No. 518,130

3 Claims. (Cl. 113—120)

The present invention relates to containers having tubular fibre bodies lined with sheet or other suitable liner material and provided with internal score lines or other weakened areas to facilitate opening the containers and has particular reference to a method of protecting the score lines or other weakened areas against contact with the contents after the containers are filled.

In the manufacture of fibre containers for products such as biscuit dough and the like, the containers are lined with a moistureproof and greaseproof liner, usually a metal foil such as tin-foil or aluminum foil, although other materials such as plastics may also be used. The fibre material from which the bodies of the containers are made usually is purchased with the liner attached since it is easier to attach the liner in the paper mill. The material as purchased is cut into blanks and the lined surface of the blanks scored to produce the score lines prior to the forming of the blank into a can body. This scoring usually is effected by rollers or dies.

In forming the score lines, the liner is severed and thus produces a pair of free parallel edges extending along the score. When the scoring die or roller leaves the score, it lifts the free edges of the liner and produces a pair of raised burrs which form an open bridge over the score line.

Thus the score line is left exposed to penetration and saturation by liquid or vapor components of the product. When thus penetrated or saturated the fibre is weakened so that the fibre body may break open along the weakened area of the score, with the resultant spoilage of the product.

An object of the instant invention is to prevent such weakening of the body by reforming or relocating the severed edges of the foil into close juxtaposition along the score, and coating at least this area of the foil with a film forming material which will bridge the reduced gap between the reformed edges of the severed foil with a continuous film that thoroughly and safely protects the underlying fibrous material from penetration by liquid or vapor.

Another object of the invention is to effect reformation or relocation of the scored and severed foil by applying a blunt tool to the severed edges to bend them back toward each other preparatory to application of the coating material.

Another object of the invention is the application of a rotary scoring tool to the foil covered fibre for effecting the scoring operation and then immediately following the scoring operation by applying a roller having a convex peripheral face which bends back the ruffled edges of foil into reformed juxtaposed or closed position preparatory to the coating operation.

Numerous other objects and advantages of the invention will be apparent as it is better understood from the following description, which, taken in connection with the accompanying drawings, discloses a preferred embodiment thereof.

Referring to the drawings.

Figure 1:
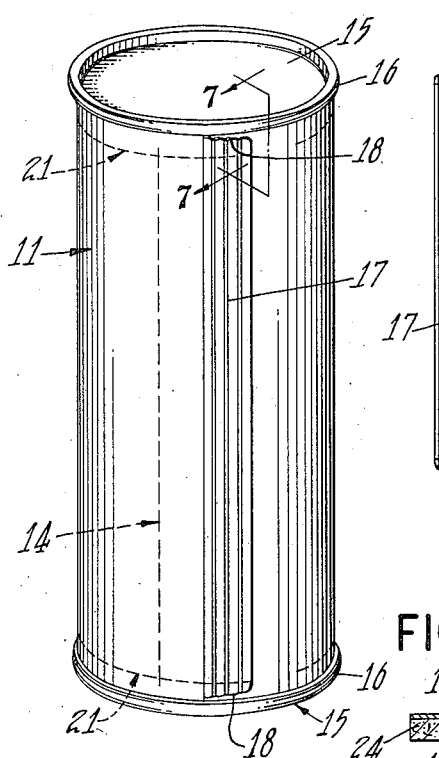
Figure 1 is a perspective view of a container of a type which may be made by method steps including those of the instant invention.
Figures 2, 7:
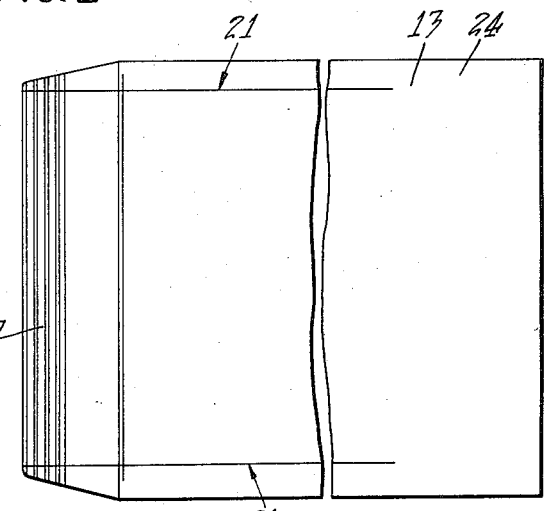
Fig. 2 is a plan view of a foil lined fibrous body blank from which the container is made, with parts broken away.
Fig. 7 is an enlarged sectional view taken substantially along a plane indicated by the lines 7—7 in Fig. 1, showing the scored and coated area of the body in its position relative to a can end closure member.

In the preferred or exemplary embodiment of the invention disclosed herein, the method of the invention is applied to the manufacture of a container comprising a body 11 of fibrous material 12 lined on the inner side with metallic foil 13 and formed with a lapped side seam 14, the body being united to end members 15 in double seams 16. The outer lap of the side seam 14 projects beyond the seam in an unsecured section 17 that is free at its lateral ends 18 from engagement in the double seam 14 so that this unsecured section may be gripped by the consumer in initiating opening of the container.

To facilitate the can opening operation, a pair of score lines or grooves 21 are formed on the inner or foil lined surface of the body. As shown in Fig. 1, these grooves are disposed inwardly from the double seams 16 so that the latter provide support at opposite ends of the body during the opening or tearing operation which severs the body along the score lines and leaves the product free and available for removal from the container.

A product such as bisquit dough must be packed in a container that is moistureproof, greaseproof, and also strong enough to resist disruptive pressure generated by or in the product. The fibrous portion of the container body is normally strong enough to resist the disruptive pressure, but it may be weakened by saturation or penetration of its porous structure by liquids or vapors. The aluminum or other metallic foil lining 13 prevents such seepage into the fibre and resultant weakening of the body structure. However, formation of the score grooves 21 in the body if not protected would permit seepage to the fibre between the edges of the severed foil along the score line.

Prior to the instant invention, coating of the foil along the score line did not of itself afford adequate protection against body weakening seepage unless it was applied in uneconomical quantities. It was found that some of the coating material would be diverted laterally from the score area by the raised edges of the foil and some coating material would enter the score groove in the fibrous base where it was absorbed by the fibre but did not provide adequate protection against subsequent fluid or vapor seepage into the fibre unless an economically prohibitive heavy coating were used.

The problem is solved by the method of this invention whereby the severed edges of the foil are reformed or relocated along the score line so that the gap between them is almost closed and relatively light coating material subsequently applied to the edges readily bridges the minimized and almost closed gap without penetrating into the score groove and forms a continuous unbroken film that prevents penetration of body weakening liquids or vapors into the fibrous base.

Figures 3, 4:
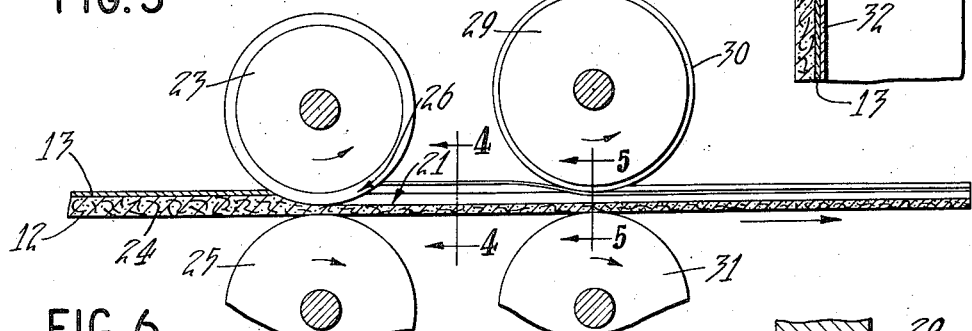
Fig. 3 is an enlarged sectional view of a portion of the body blank and one form of apparatus for scoring the blank and reforming the severed foil edges in accordance with the steps of the instant method invention.
Fig. 4 is a section taken substantially along the line 4—4 in Fig. 3 showing the raised and ruffled edges of the foil after the scoring operation.

The scoring operation may be effected by any suitable means such as a reciprocatory or rotary scoring tool. As shown in Fig. 3 of the drawings, a flat body blank 24 is advanced in the direction of the arrow and between a rotary scoring tool having a relatively thin or knife edge 23 and an anvil or support roller 25 to form progressively in the fibrous base a substantially V-shaped score groove 21. During this scoring operation, the advancing edge of the rotary knife severs the foil and forces the parted edges thereof downwardly into and against the formed groove 21 in the fibre. But this is momentary; receding portions 26 of the scoring tool, as they emerge from the groove, engage the foil edges, raise them above the groove, and leave the edges in a raised and ruffled condition as shown in Fig. 4.

Figure 5:
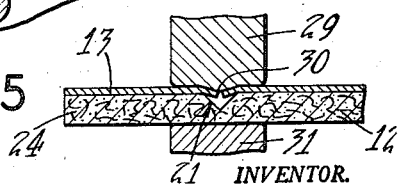
Fig. 5 is an enlarged sectional view taken substantially along the line 5—5 in Fig. 3.

Reformation of these raised edges of the foil may be effected by a resilient or rigid blunt tool, such as a roller 29 (Figs. 3 and 5) which may be provided with a substantially convex peripheral surface 30 that engages the ruffled edges and, in cooperation with an anvil or support roll 31 beneath the advancing blank, progressively bends the edges back toward each other to minimize or close the gap therebetween. As shown in Fig. 5, these edges may be bent into the score groove so that they almost span the opening to the groove.

Figure 6:
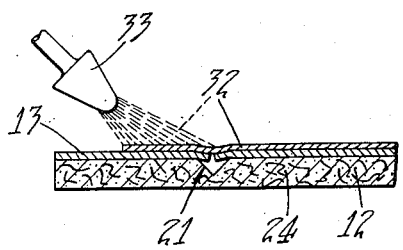
Fig. 6 is a view similar to Fig. 5 and showing the application of coating material to the foil and across its reformed severed edges.

When the foil edges are thus relocated, a light coating of suitable material is applied to them. A wide variety of coating materials, including lacquer, hot melt or waxy plastic compositions, may be used for this purpose. In Fig. 6, the coating material 32 is shown as projected from a conventional spray nozzle 33 onto the foil 13 and across the groove 21 of a blank 24 passing under the nozzle. However, the coating material may be applied in other ways and at other stages of manufacture of the container. It may be applied over the entire inner surface of the container wall or confined to the groove areas. The resultant thin protective film of coating material which then bridges the minimized gap between the reformed foil edges adequately closes and seals off the groove in the fibre so that neither moisture, grease, nor vapor can penetrate to the fibrous base of the body of a filled container, and the container will retain its original high strength to resist breakage or disruption.

It is thought that the invention and many of the attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. In the manufacture of scored container bodies from blanks having a fibrous base overlaid with metallic foil, the method comprising the steps of progressively scoring a said blank with a rotary tool having a relatively thin scoring edge applied to and severing said foil along a predetermined line and forming in said fibrous base beneath the foil a groove extending along said line, the edges of the severed foil being raised from the groove and ruffled by portions of the rotary knife as said tool portions recede from the formed groove; progressively applying pressure to said raised and ruffled foil edges closely following said scoring step to bend said raised edges back into close proximity to each other at said groove; and applying a coating material over said foil along and adjacent to said closely proximate severed foil edges, whereby said coating material bridges all gaps between said foil edges and thus provides a continuous and unbroken protective film over said groove in the fibrous base.

2. The method set forth in claim 1 wherein said application of pressure to said raised and ruffled foil edges is effected by the peripheral face of a roller.

3. The method set forth in claim 2 wherein said peripheral face of the roller is substantially convex to bend the raised edges of the foil back toward each other and slightly into the groove formed by the scoring tool.

References Cited in the file of this patent

UNITED STATES PATENTS

| | | |
|---|---|---|
| 2,176,898 | Fried | Oct. 24, 1939 |
| 2,608,341 | Eckman | Aug. 26, 1952 |
| 2,695,847 | Fisher | Nov. 30, 1954 |